Feb. 9, 1954  N. FISHER  2,668,902
HEADLAMP RIM LIGHT
Filed Dec. 9, 1949
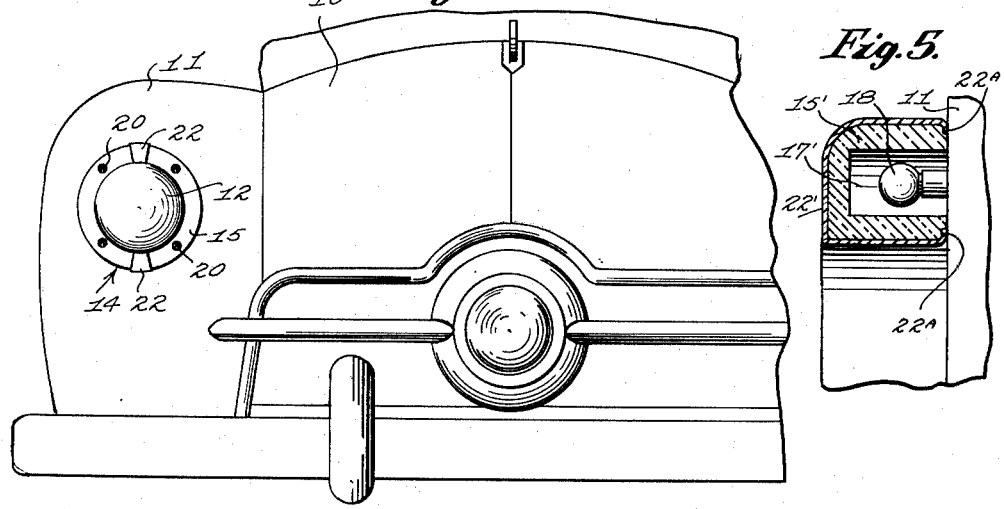
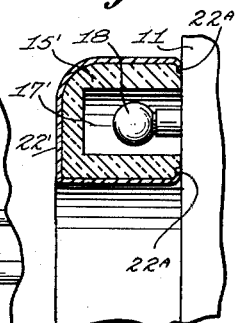
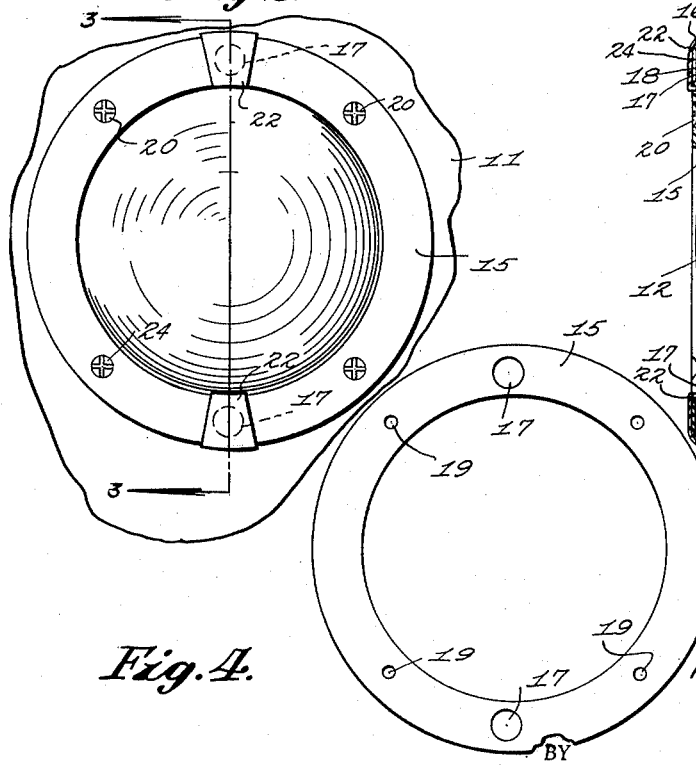
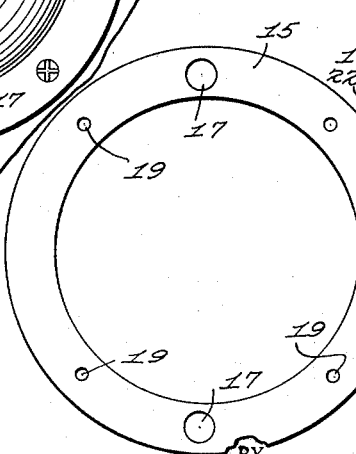
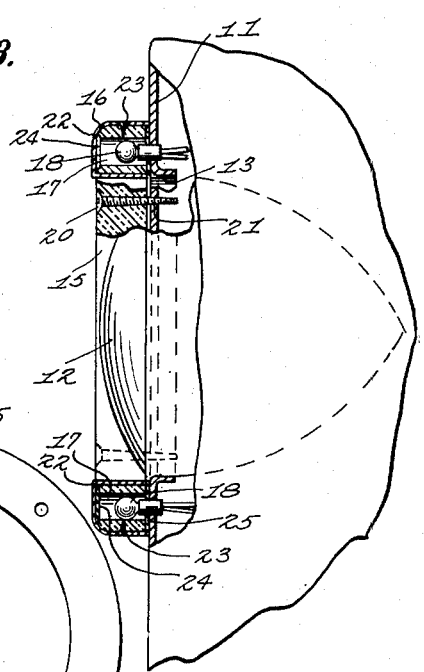
INVENTOR
NATHAN FISHER
BY
McMorrow, Berman & Davidson
ATTORNEYS Patented Feb. 9, 1954

2,668,902

UNITED STATES PATENT OFFICE 2,668,902

HEADLAMP RIM LIGHT

Nathan Fisher, Mount Kisco, N. Y.

Application December 9, 1949, Serial No. 131,987

1 Claim. (Cl. 240—7.1)

My invention relates to a light for automobiles and the like.

A primary object of my invention is to provide a combined parking light and head light rim, to take the place of the usual chrome plated sheet metal rim or ring extending about the margin of fender mounted automobile head lights.

A further object is to provide a parking light for automobiles which will use no more current than conventional parking lights, but which will provide illumination over a much wider area, without any glare.

A further object is to provide a combined head light rim and parking light formed of a suitable light transmitting plastics material, whereby the light emitted from a small bulb will be transmitted about the entire marginal edge of the head light.

A still further object is to provide a combined device of the above mentioned character, which is highly simplified, compact and neat and attractive.

Other objects and advantages of the invention will be apparent during the course of the following description.

In the accompanying drawings, forming a part of this application, and in which like numerals are employed to designate like parts throughout the same, Figure 1 is a fragmentary front elevation of an automobile having a fender mounted head light equipped with the combined parking light and rim embodying the invention, Figure 2 is an enlarged front side elevation of the combined head light rim and parking light, Figure 3 is a central vertical section taken on line 3—3 of Figure 2, Figure 4 is a side elevation of the combined rim and parking light removed, and Figure 5 is an enlarged fragmentary radial section through a combined parking light and head light rim embodying a slight modification of the invention.

In the drawings, where for the purpose of illustration are shown preferred embodiments of my invention, attention is directed first to Figures 1 to 4 inclusive, wherein the numeral 10 designates an automobile having a front fender 11, equipped with the usual head light 12, securely mounted within an opening 13 of the fender by any suitable conventional means.

In place of the usual decorative marginal sheet metal rim, secured to the fender and surrounding the head light 12, I provide my combined head light rim and parking light, designated generally by the numeral 14. The combined device 14 comprises an annular ring 15 formed of a suitable light transmitting material. The ring 15 is preferably rectangular in transverse cross section and may have its outer marginal edge or corner rounded, as shown at 16. The ring 15 is flat for engagement against the flat forward face of the fender 11, adjacent to the margin of the head light 12, and the ring is relatively thin axially. The ring 15 is preferably provided at diametrically opposite points with a pair of axial openings 17, extending entirely through the ring and forming chambers for a pair of small electric light bulbs 18 mounted within small openings in the forward side of the bender, adjacent to the top and bottom of the head light 12. The ring 15 is further provided with a plurality of small circumferentially spaced openings 19, extending axially therethrough, and receiving screws 20 engaging in screw threaded openings 21 of the fender, for rigidly securing the ring 15 to the forward side of the fender and surrounding the marginal edge of the head light 12.

Adjacent to the light bulbs 18 and openings 17, I provide masking or glare eleminating shields 22, which may be formed of sheet metal, colored plastics material or the like. The purpose of the shields 22 is to eliminate or reduce light transmission adjacent to the bulbs 18, liable to form glare. As shown in Figure 3, the shields 22 are formed so that they extend over the forward side of the ring 15, adjacent to the openings 17 for covering such openings, and inwardly adjacent to the inner and outer sides of the ring. The shields 22 may be detachably secured to the ring by means of radially extending screws 23 extending through openings in the outer sides of the shields and anchored within the ring 15. Gaskets 24 may be arranged adjacent to the outer ends of the openings 17 and beneath the shields 22 to seal off the openings 17 from dirt, water and the like. The rear flat side of the ring 15 is preferably sand blasted to roughen it and then coated with a heavy coating of aluminum lacquer, or some other light reflecting substance, as shown at 25. The shields 22 are preferably formed of stainless steel, or chrome plated spring brass.

If desired, the ring 15 may be formed in two semi-circular sections, and these sections or one of them may be colored. If desired, the glare eliminating shields 22 may be formed of colored translucent plastics material, and the device may serve as an indicator for the direction of turning of the automobile, by having the light bulb 18 connected in the circuit of the automobile for blinking, in the usual manner. I also contemplate eliminating one of the light bulbs 18 and one of the openings 17.

In use, the ring 15 is mounted upon the fender as previously described, and when the bulbs 18 are lit, the light which they emit will be transmitted entirely about the ring 15, which extends about the marginal edge of the head light. The ring will emit a soft glowing light without any glare. The ring is relatively large and will illuminate a large area of the fender, and is ideal for use as a parking light, since it uses no more current than any other parking light employing a small bulb or bulbs 18. To remove or replace a bulb 18, it is merely necessary to remove the adjacent shield 22 and gasket 24, and not the entire ring 15.

In addition to illuminating a large area of the fender, the ring will also transmit light inwardly and radially of the headlight unit, the light transmitted in this manner by the ring striking the convex outer surface of the headlight lens. Said convex outer surface of the headlight lens projects beyond the edge of the opening of the automobile body in which the headlight is mounted (see Figure 3), and the ring constituting the present invention is formed with a cylindrical inner surface which projects outwardly from the automobile body a distance substantially equal to the distance the lens projects, at the point of greatest projection of the lens, said point being the center of the lens. This arrangement is desirable, in that the light transmitted from the ring will strike and illuminate the convex outer surface of the lens, so as to increase substantially the visibility afforded through use of the ring.

In Figure 5, I have shown a slight modification of the invention, wherein the ring designated by the numeral 15' is provided with one or more recesses or openings 17' in its rear side, and forming chambers for the bulbs 18, as in the first form of the invention. The recesses 17' do not extend axially entirely through the ring 15', but terminate rearwardly of the forward side of the ring. The ring 15' is equipped adjacent to the bulbs 18 thereof with glare eliminating shields 22', similar to the shields 22, but including rear in-turned extensions 22ª which engage beneath the rear side of the ring 15' and which may be seated in shallow recesses or notches formed in such rear side and clamped against the forward face of the fender when the ring 15' is secured in place. The shields 22' serve only to eliminate glare from the bulbs 18, and in the form of the invention shown in Figure 5, it is necessary to remove the entire ring 15' when changing a light bulb 18. All other parts and their functions are identical with those shown and described in connection with the first form of the invention.

It is to be understood that the forms of my invention herewith shown and described are to be taken as preferred examples of the same, and that various changes in the shape, size, and arrangement of parts, may be resorted to without departing from the spirit of the invention or the scope of the subjoined claim.

Having thus described my invention, I claim:

A lighting device for mounting about the headlamp-receiving opening of an automobile body, comprising: a solid, annular ring unbroken throughout its circumference and formed of light-transmitting material, said ring being proportioned to extend about the edge of said opening and having a cylindrical inner surface concentric with the opening, said ring having fastening elements spaced circumferentially thereof and projecting rearwardly therefrom for connection to an automobile body against which the rear surface of the ring is engaged, the ring having diametrically opposite transverse openings formed therein, said openings of the ring terminating at one end short of the front surface of the ring and opening at their other ends upon said rear surface of the ring; light sources for the ring disposed in the openings thereof and having base portions projecting rearwardly from the ring for mounting in said body, said light sources being adapted to transmit light through the full circumference of the ring; and U-shaped, opaque shields straddling said ring at the locations of the openings thereof, the bights of said shields overlying the front surface of the ring and the legs thereof extending over the sides of the ring into contact with said body to prevent transmission of light through the surface of the ring covered by said bight and legs of the shield.

NATHAN FISHER.

References Cited in the file of this patent
UNITED STATES PATENTS

| Number | Name | Date |
| --- | --- | --- |
| 1,351,635 | Forsberg | Aug. 31, 1920 |
| 1,751,070 | Boots | Mar. 18, 1930 |
| 1,849,554 | Smith | Mar. 15, 1932 |
| 1,971,101 | Florell | Aug. 21, 1934 |
| 2,207,117 | Collins | July 9, 1940 |
| 2,219,143 | Wharam | Oct. 22, 1940 |
| 2,259,910 | Rylsky | Oct. 21, 1941 |
| 2,295,176 | Kelly | Sept. 8, 1942 |
| 2,320,917 | Ely | June 1, 1943 |
| 2,365,864 | Chapman | Dec. 26, 1944 |
| 2,480,393 | Bossert | Aug. 30, 1949 |

FOREIGN PATENTS

| Number | Country | Date |
| --- | --- | --- |
| 309,672 | Great Britain | Apr. 18, 1920 |
| 362,649 | Great Britain | Dec. 10, 1931 |